(12) United States Patent
Parrinello et al.

(10) Patent No.: US 8,388,878 B2
(45) Date of Patent: Mar. 5, 2013

(54) METHOD FOR PRODUCING MICROPOROUS SHEET

(75) Inventors: Luciano M. Parrinello, Allison Park, PA (US); James L. Boyer, Monroeville, PA (US); Jun Deng, Murrsyville, PA (US); Yi J. Warburton, Sewickley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 693 days.

(21) Appl. No.: 12/059,145

(22) Filed: Mar. 31, 2008

(65) Prior Publication Data

US 2009/0246503 A1 Oct. 1, 2009

(51) Int. Cl.
*B28B 3/20* (2006.01)
*C08J 9/28* (2006.01)

(52) U.S. Cl. .......... 264/176.1; 264/41; 264/48; 521/61; 521/64

(58) Field of Classification Search .......... 264/176.1, 264/211, 41, 48; 521/61, 64
See application file for complete search history.

(56) References Cited

U.S. PATENT DOCUMENTS

| | | | |
|---|---|---|---|
| 2,940,830 A | 6/1960 | Thornhill | |
| 4,681,750 A | 7/1987 | Johnson et al. | |
| 4,726,989 A * | 2/1988 | Mrozinski | 428/315.5 |
| 4,833,172 A * | 5/1989 | Schwarz et al. | 521/62 |
| 4,877,679 A | 10/1989 | Leatherman et al. | |
| 5,032,450 A | 7/1991 | Rechlicz et al. | |
| 5,064,560 A * | 11/1991 | Merchant | 252/67 |
| 5,196,262 A | 3/1993 | Schwarz et al. | |
| 5,827,812 A * | 10/1998 | Flynn et al. | 510/411 |
| 5,948,557 A | 9/1999 | Ondeck et al. | |
| 6,387,519 B1 | 5/2002 | Anderson et al. | |
| 2007/0012617 A1 * | 1/2007 | Suzuki et al. | 210/500.27 |

FOREIGN PATENT DOCUMENTS

GB 1044028 9/1966

OTHER PUBLICATIONS

Agency for Toxic Substances and Disease Registry (ATSDR), "Case Studies in Environmental Medicine (CSEM) Trichloroethylene Toxicity", http://www.atsdr.cdc.gov/csem/tce/docs/tce.pdf.*

* cited by examiner

*Primary Examiner* — Richard Crispino
*Assistant Examiner* — Elizabeth Royston
(74) *Attorney, Agent, or Firm* — Deborah M. Altman

(57) ABSTRACT

Provided is a method of producing a microporous sheet material of a polymeric matrix of polyolefin, with finely divided and substantially water-insoluble filler distributed throughout the matrix, and a network of interconnecting pores communicating throughout the microporous material. The method includes: (a) forming a mixture of polyolefin, filler and a processing plasticizer composition; (b) extruding the mixture to form a continuous sheet; and (c) contacting the continuous sheet with a non-flammable extraction fluid composition to extract the processing plasticizer composition from the continuous sheet. The extraction fluid has a boiling point of 75° C. or less, and is essentially free of trichloroethylene. The microporous sheet material has Tensile Strength equal to or greater than 800 kPa. A microporous sheet material also is provided.

18 Claims, No Drawings

US 8,388,878 B2

METHOD FOR PRODUCING MICROPOROUS SHEET

FIELD OF THE INVENTION

The present invention relates to a method for producing a microporous sheet material.

BACKGROUND OF THE INVENTION

In recent years synthetic papers have been developed for use in the printing and labeling industries. Synthetic papers offer significant advantages over natural wood pulp paper including, for example, improved print quality, water resistance, tear resistance, and tensile strength. Such materials typically are comprised of polymeric materials such as polyolefins or polyesters.

In the manufacture of certain microporous polyolefin sheet materials, the polyolefin polymers typically are blended with finely divided, water-insoluble filler materials and organic plasticizers. The blend of materials is extruded through a sheeting die to form a continuous sheet comprised of a polyolefin polymer matrix having finely divided, water-insoluble filler material distributed throughout the matrix. A network of interconnecting pores communicates throughout the microporous sheet material. The organic plasticizer, which facilitates the extrusion process, is extracted from the sheet by contacting the sheet with an extraction fluid composition. Conventional extraction fluid compositions include, for example, halogenated hydrocarbons such as 1,1,2-trichloroethylene, perchlorethylene, 1,2-dichloroethane, 1,1,1-trichlorethane, 1,1,2-trichlorethane and methylene chloride; or alkanes such as hexane, heptane, and toluene.

For many end use applications, it is important to remove some or a significant portion of the organic plasticizer from the microporous sheet material. For example, where the microporous sheet material is to be used as a printable sheet, residual plasticizer could negatively impact print quality. Also, where the microporous sheet material is to be used as a layer in a multi-layer laminate structure, for example, as an identification card, a high residual plasticizer content could negatively impact lamination peel strength. Of course, for some end use applications a higher residual plasticizer content may be advantageous.

Likewise, it is desirable that there is minimal residual extraction fluid composition in the microporous sheet. For example, residual extraction fluid should be minimized or eliminated altogether from the microporous sheet material where the microporous sheet material ultimately is to be used as a labeling or packaging material for food or pharmaceutical products. In some manufacturing processes, use of the abovementioned conventional extraction fluid compositions such as the alkanes has been avoided because these materials are flammable, thus requiring special handling and equipment. Also, some of the conventional halogenated hydrocarbons have been identified as substances of very high concern under human health and environmental regulations, such as the Registration, Evaluation and Authorisation of Chemicals ("REACH") system recently adopted in the European Union. For example trichloroethylene, a level 2 carcinogen, is likely to be listed as a "carcinogenic, mutagenic, or toxic to reproduction" ("CMR") substance under the REACH system.

In view of the foregoing, it would be desirable to manufacture microporous sheet material using an extraction fluid composition that is easily removable from the final microporous sheet material, is non-flammable, and is not a substance of concern under human health and environmentally regulations.

SUMMARY OF THE INVENTION

The present invention is directed to a method of producing a microporous sheet material comprising: a polymeric matrix comprising polyolefin, finely divided, substantially water-insoluble filler distributed throughout the matrix, and a network of interconnecting pores communicating throughout the microporous material. The method comprises: (a) forming a mixture comprising polyolefin, inorganic filler and a processing plasticizer composition; (b) extruding the mixture to form a continuous sheet; and (c) contacting the continuous sheet with a non-flammable extraction fluid composition to extract the processing plasticizer composition from the continuous sheet. The extraction fluid composition has a boiling point of 75° C. or less, and is essentially free of trichloroethylene. The microporous sheet material thus formed has performance properties, for example, Tensile Strength, equal to or greater than 800 kPa. A microporous sheet material prepared by the method also is provided.

DETAILED DESCRIPTION OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The various embodiments and examples of the present invention as presented herein are each understood to be non-limiting with respect to the scope of the invention.

As previously mentioned, the present invention is directed to a method of producing a microporous sheet material which comprises a polymeric matrix comprising polyolefin, finely divided, substantially water-insoluble inorganic filler distributed throughout the matrix, and a network of interconnecting pores communicating throughout the microporous material.

The method of the present invention comprises:

(a) forming a mixture comprising polyolefin filler, and a processing plasticizer composition;

(b) extruding the mixture to form a continuous sheet; and (c) contacting the continuous sheet with a non-flammable extraction fluid composition to extract the processing plasticizer composition from the continuous sheet to form the microporous sheet material.

The extraction fluid composition has a boiling point of 75° C. or less, and is essentially free of trichloroethylene. The microporous sheet material has Tensile Strength equal to or greater than 800 kPa.

As used herein, "microporous material" or "microporous sheet material" means a material having a network of interconnecting pores, wherein, on a coating-free, printing ink-free, impregnant-free, and pre-bonding basis, the pores have a volume average diameter ranging from 0.001 to 0.5 micrometer, and constitute at least 5 percent by volume of the material as discussed herein below.

Polyolefin

The microporous material of the present invention comprises a matrix of polyolefin (e.g., polyethylene and/or polypropylene) such as, high density and/or ultrahigh molecular weight polyolefin.

Non-limiting examples of the ultrahigh molecular weight (UHMW) polyolefin can include essentially linear UHMW polyethylene or polypropylene. Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often the degree of isotacticity of such polymer is at least 95 percent, e.g., at least 98 percent.

While there is no particular restriction on the upper limit of the intrinsic viscosity of the UHMW polyethylene, in one non-limiting example, the intrinsic viscosity can range from 18 to 39 deciliters/gram, e.g., from 18 to 32 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

For purposes of the present invention, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation:

$$M = 5.37 \times 10^4 [\acute{\eta}]^{1.37}$$

wherein M is the nominal molecular weight and $[\acute{\eta}]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 10^4 [\acute{\eta}]^{1.25}$$

wherein M is the nominal molecular weight and $[\acute{\eta}]$ is the intrinsic viscosity of the UHMW polypropylene expressed in deciliters/gram.

A mixture of substantially linear ultrahigh molecular weight polyethylene and lower molecular weight polyethylene can be used. In a non-limiting embodiment, the UHMW polyethylene has an intrinsic viscosity of at least 10 deciliters/gram, and the lower molecular weight polyethylene has an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262, which disclosure is incorporated herein by reference. More particularly, the weight percent of UHMW polyethylene used is described in relation to FIG. 6 of U.S. Pat. No. 5,196,262; namely, with reference to the polygons ABCDEF, GHCI or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE are found in the following Table 1.

TABLE 1

| Type | Abbreviation | Density, g/cm³ |
| --- | --- | --- |
| Low Density Polyethylene | LDPE | 0.910-0.925 |
| Medium Density Polyethylene | MDPE | 0.926-0.940 |
| High Density Polyethylene | HDPE | 0.941-0.965 |

Any or all of the polyethylenes listed in Table 1 above may be used as the LMWPE in the matrix of the microporous material. HDPE may be used because it can be more linear than MDPE or LDPE. Processes for making the various LMWPE's are well known and well documented. They include the high pressure process, the Phillips Petroleum Company process, the Standard Oil Company (Indiana) process, and the Ziegler process. The ASTM D 1238-86 Condition E (that is, 190° C. and 2.16 kilogram load) melt index of the LMWPE is less than about 50 grams/10 minutes. Often the Condition E melt index is less than about 25 grams/10 minutes. The Condition E melt index can be less than about 15 grams/10 minutes. The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes such as at least 1.0 gram/10 minutes.

The UHMWPE and the LMWPE may together constitute at least 65 percent by weight, e.g., at least 85 percent by weight, of the polyolefin polymer of the microporous material. Also, the UHMWPE and LMWPE together may constitute substantially 100 percent by weight of the polyolefin polymer of the microporous material.

In a particular embodiment of the present invention, the microporous material can comprise a polyolefin comprising ultrahigh molecular weight polyethylene, ultrahigh molecular weight polypropylene, high density polyethylene, high density polypropylene, or mixtures thereof.

If desired, other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. In general, a greater amount of other thermoplastic organic polymer may be used if the molecular structure contains little branching, few long side chains, and few bulky side groups, than when there is a large amount of branching, many long side chains, or many bulky side groups. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, and copolymers of ethylene and methacrylic acid. If desired. all or a portion of the carboxyl groups of carboxyl-containing copolymers can be neutralized with sodium, zinc or the like. Generally, the microporous material comprises at least 70 percent by weight of UHMW polyolefin, based on the weight of the matrix. In a non-limiting embodiment, the above-described other thermoplastic organic polymer are substantially absent from the matrix of the microporous material.

Filler

As previously mentioned, the microporous material also comprises a finely-divided, substantially water-insoluble particulate filler material. The filler material can comprise an organic particulate material and/or an inorganic particulate material. The filler material typically is not colored, for example, the filler material is white or off-white filler material such as a siliceous or clay particulate material.

The finely divided substantially water-insoluble filler particles can constitute from 20 to 90 percent by weight of the microporous sheet material. For example, such filler particles can constitute from 20 to 90 percent by weight of the microporous material, such as from 30 percent to 90 percent by weight of the microporous material, or from 40 to 90 percent by weight of the microporous material, or from 50 to 90 percent by weight of the microporous material and even from 60 percent to 90 percent by weight of the microporous material.

The finely divided substantially water-insoluble filler may be in the form of ultimate particles, aggregates of ultimate particles, or a combination of both. At least about 90 percent by weight of the filler used in preparing the microporous material substrate has gross particle sizes in the range of from 0.5 to about 200 micrometers, such as from 1 to 100 micrometers, as determined by the use of a laser diffraction particle size instrument, LS230 from Beckman Coulter, capable of measuring particle diameters as small as 0.04 micron. Typically, at least 90 percent by weight of the filler has gross particle sizes in the range of from 10 to 30 micrometers. The sizes of the filler agglomerates may be reduced during processing of the ingredients used to prepare the microporous material. Accordingly, the distribution of gross particle sizes in the microporous material may be smaller than in the raw filler itself.

Non-limiting examples of suitable organic and inorganic particulate materials are described in U.S. Pat. No. 6,387,519 B1 at column 9, line 4 to column 13, line 62, the cited portions of which are incorporated herein by reference.

In a particular embodiment of the present invention, the filler material comprises siliceous materials. Non-limiting examples of siliceous fillers that may be used to prepare the microporous material include silica, mica, montmorillonite, kaolinite, nanoclays such as cloisite available from Southern Clay Products, talc, diatomaceous earth, vermiculite, natural and synthetic zeolites, calcium silicate, aluminum silicate, sodium aluminum silicate, aluminum polysilicate, alumina silica gels and glass particles. In addition to the siliceous fillers, other finely divided particulate substantially water-insoluble fillers optionally may also be employed. Non-limiting examples of such optional fillers can include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate. In one non-limiting embodiment, silica and any of the aforementioned clays can comprise the siliceous filler. Non-limiting examples of the silicas include precipitated silica, silica gel, and fumed silica.

Silica gel is generally produced commercially by acidifying an aqueous solution of a soluble metal silicate, e.g., sodium silicate at low pH with acid. The acid employed is generally a strong mineral acid such as sulfuric acid or hydrochloric acid, although carbon dioxide can be used. Inasmuch as there is essentially no difference in density between the gel phase and the surrounding liquid phase while the viscosity is low, the gel phase does not settle out, that is to say, it does not precipitate. Consequently, silica gel may be described as a non-precipitated, coherent, rigid, three-dimensional network of contiguous particles of colloidal amorphous silica. The state of subdivision ranges from large, solid masses to sub-microscopic particles, and the degree of hydration from almost anhydrous silica to soft gelatinous masses containing on the order of 100 parts of water per part of silica by weight.

Precipitated silica generally is produced commercially by combining an aqueous solution of a soluble metal silicate, ordinarily alkali metal silicate such as sodium silicate, and an acid so that colloidal particles of silica will grow in a weakly alkaline solution and be coagulated by the alkali metal ions of the resulting soluble alkali metal salt. Various acids may be used, including but not limited to mineral acids. Non-limiting examples of acids that can be used include hydrochloric acid and sulfuric acid, but carbon dioxide can also be used to produce precipitated silica. In the absence of a coagulant, silica is not precipitated from solution at any pH. In a non-limiting embodiment, the coagulant used to effect precipitation of silica may be the soluble alkali metal salt produced during formation of the colloidal silica particles, or it may be an added electrolyte, such as a soluble inorganic or organic salt, or it may be a combination of both.

Precipitated silica can be described as precipitated aggregates of ultimate particles of colloidal amorphous silica that have not at any point existed as macroscopic gel during the preparation. The sizes of the aggregates and the degree of hydration may vary widely. Precipitated silica powders differ from silica gels that have been pulverized in generally having a more open structure, that is, a higher specific pore volume. However, the specific surface area of precipitated silica, as measured by the Brunauer, Emmet, Teller (BET) method using nitrogen as the adsorbate, is often lower than that of silica gel.

Many different precipitated silicas can be employed as the siliceous filler used to prepare the microporous sheet material. Precipitated silicas are well-known commercial materials, and processes for producing them are described in detail in many United States Patents, including U.S. Pat. Nos. 2,940, 830, and 4,681,750. The average ultimate particle size (irrespective of whether or not the ultimate particles are agglomerated) of precipitated silicas used is generally less than 0.1 micrometer, e.g., less than 0.05 micrometer or less than 0.03 micrometer, as determined by transmission electron microscopy. Precipitated silicas are available in many grades and forms from PPG Industries, Inc. These silicas are sold under the Hi-Sil® trademark.

In a non-limiting embodiment, finely divided particulate substantially water-insoluble siliceous filler comprises at least 50 percent by weight, e.g., at least 65, at least 75 percent by weight, or at least 90 percent by weight of the substantially water-insoluble filler material. The siliceous filler can comprise from 50 to 90 percent by weight, e.g., from 60 to 80 percent by weight, of the filler material, or the siliceous filler can comprise substantially all of the substantially water-insoluble filler material.

The filler, e.g., the siliceous filler, typically has a high surface area allowing the filler to carry much of the processing plasticizer composition used in the method of the present invention to produce microporous material. High surface area fillers are materials of very small particle size, materials that have a high degree of porosity, or materials that exhibit both characteristics. The surface area of at least the siliceous filler particles can range from 20 to 400 square meters per gram, e.g., from 25 to 350 square meters per gram, as determined by the Brunauer, Emmett, Teller (BET) method according to ASTM D1993-91. The BET surface area is determined by fitting five relative-pressure points from a nitrogen sorption isotherm measurement made using a Micromeritics TriStar 3000™ instrument. A FlowPrep-060™ station can be used to provide heat and continuous gas flow during sample preparation. Prior to nitrogen sorption, silica samples are dried by heating to 160° C. in flowing nitrogen (PS) for 1 hour. Generally, but not necessarily, the surface area of any non-siliceous filler particles used is also within one of these ranges. The filler particles are substantially water-insoluble and also can be substantially insoluble in any organic processing liquid used to prepare the microporous material. This can facilitate retention of the filler in the microporous material.

Interconnecting Pores

As mentioned above, the microporous sheet material produced by the method of the present invention comprises a network of interconnecting pores communicating throughout the microporous material. On an impregnant-free basis, such pores can comprise at least 15 percent by volume, e.g. from at least 20 to 95 percent by volume, or from at least 25 to 95 percent by volume, or from 35 to 70 percent by volume of the microporous material. As used herein and in the claims, the porosity (also known as void volume) of the microporous material, expressed as percent by volume, is determined according to the following equation:

$$\text{Porosity}=100[1-d_1/d_2]$$

wherein $d_1$ is the density of the sample, which is determined from the sample weight and the sample volume as ascertained from measurements of the sample dimensions, and $d_2$ is the density of the solid portion of the sample, which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material can be determined by mercury porosimetry using an Autopore III porosimeter (Micromeretics, Inc.) in accordance with the accompanying operating manual. The volume average pore radius for a single scan is automatically determined by the porosimeter. In operating the porosimeter, a scan is made in the high pressure range (from 138 kilopascals absolute to 227 megapascals absolute). If approximately 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d=2[v_1r_1/w_1+v_2r_2/w_2]/[v_1/w_1+v_2/w_2]$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. The volume average diameter of the pores can be in the range of from 0.001 to 0.50 micrometers, e.g., from 0.005 to 0.30 micrometers, or from 0.01 to 0.25 micrometers.

In the course of determining the volume average pore diameter of the above procedure, the maximum pore radius detected is sometimes noted. This is taken from the low pressure range scan, if run; otherwise it is taken from the high pressure range scan. The maximum pore diameter is twice the maximum pore radius. Inasmuch as some production or treatment steps, e.g., coating processes, printing processes, impregnation processes and/or bonding processes, can result in the filling of at least some of the pores of the microporous material, and since some of these processes irreversibly compress the microporous material, the parameters in respect of porosity, volume average diameter of the pores, and maximum pore diameter are determined for the microporous material prior to the application of one or more of such production or treatment steps.

Processing Plasticizer Composition

As previously mentioned, a processing plasticizer composition is used in conjunction with the polyolefin and the inorganic filler in the method of producing a microporous sheet material of the present invention. For purposes of the present invention, the processing plasticizer composition should have little solvating effect on the polyolefin at 60° C., and only a moderate solvating effect at elevated temperatures on the order of 100° C. The processing plasticizer composition generally is a liquid at room temperature. Non-limiting examples of the processing plasticizer composition can include processing oils such as paraffinic oil, naphthenic oil, or aromatic oil. Examples of processing oils can include, but are not limited to, those processing oils meeting the requirements of ASTM D 2226-82, Types 103 and 104. Advantageously, the processing oil has a pour point of less than 22° C., according to ASTM D 97-66 (reapproved 1978), e.g., less than 10° C. Non-limiting examples of processing oils that may be used can include SHELLFLEX® 412 oil, SHELLFLEX® 371 oil (Shell Oil Co.), which are solvent refined and hydrotreated oils derived from naphthenic crude oils, ARCOprime® 400 oil (Atlantic Richfield Co.) and KAYDOL® oil (Witco Corp.), which are white mineral oils. Other non-limiting examples of processing plasticizers can include phthalate ester plasticizers, such as dibutyl phthalate, bis(2-ethylhexyl) phthalate, diisodecyl phthalate, dicyclohexyl phthalate, butyl benzyl phthalate, and ditridecyl phthalate. Mixtures of any of the foregoing processing plasticizers can be used in the method of the present invention.

In addition to the polyolefin, the inorganic filler and the processing plasticizer, any of a wide variety of optional ingredients can be included. For example, minor amounts, usually less than 10 percent by weight, of other materials used in processing such as lubricant, surfactant, water, and the like, also can be present. Yet other materials introduced for particular purposes optionally may be present in the microporous material in small amounts, usually less than about 15 percent by weight. Examples of such materials can include antioxidants, ultraviolet light absorbers, reinforcing fibers such as chopped glass fiber strand, dyes, pigments, security features, and the like. The balance of the microporous material, exclusive of filler and any coating, printing ink, or impregnant applied for one or more specific purposes is essentially the organic polymer.

General Method of Producing the Microporous Sheet

The method of the present invention used to produce microporous sheet material comprises mixing the polyolefin, the inorganic filler, and the processing plasticizer composition (as well as any of the optional ingredients discussed herein below) until a substantially uniform mixture is obtained. Then, the mixture together with additional processing plasticizer composition, if required, is introduced into the heated barrel of an extruder, for example, a screw extruder, to which is attached a sheeting die. A continuous sheet formed by the sheeting die is produced. Optionally, the sheet may be forwarded to a pair of heated calender rolls acting cooperatively to form a continuous sheet of lesser thickness than the continuous sheet exiting from the die.

The continuous sheet then is forwarded to a first extraction zone where the processing plasticizer composition is substantially removed by contacting the sheet with a non-flammable extraction fluid composition which is essentially free of trichloroethylene, typically an organic fluid, which is a good solvent for the processing plasticizer and a poor solvent for the polyolefin, and more volatile than the processing plasticizer. Generally, but not necessarily, both the processing plasticizer and the extraction fluid composition are substantially immiscible with water. The continuous sheet may then forwarded to a second extraction zone where the extraction fluid composition is substantially removed by steam and/or water. The continuous sheet may then be passed through a forced air dryer for substantial removal of residual water and residual extraction fluid composition. From the dryer the continuous sheet, which is a microporous material, can be passed to a take-up roll.

As used herein, in the specification and in the claims, by "non-flammable" is meant that the extraction fluid composition is not readily ignitable and has a flash point above 55° C. as determined by a closed cup method.

As used herein, in the specification and in the claims, by "essentially free of trichloroethylene" is meant that the extraction fluid composition contains 0.5% or less, for example 0.1% or less, of trichloroethylene.

The resulting microporous sheet material typically comprises 70% or less by weight of processing plasticizer composition as residual processing plasticizer, such as 30% or less by weight, or 20% or less by weight, or 15% by weight or less, or 10% by weight or less, or 5% by weight or less, or 2% by weight or less, based on weight of the microporous sheet material. For purposes of the present invention the level of residual processing plasticizer composition present in the microporous sheet material is determined using the Soxhlet extraction method described herein below in the Examples.

Extraction Fluid Composition

As mentioned above, the extraction fluid compositions suitable for use in the method of the present invention are non-flammable and essentially free of trichloroethylene. Also the extraction fluid composition used in the method of the present invention has a boiling point of 90° C. or less, such as 75° C. or less, or 60° C. or less, or 50° C. or less. For example, the extraction fluid composition can have a boiling point ranging from 20° C. to 75° C., such as from 20° C. to 65° C., or from 20° C. to 45° C.

Additionally, the extraction fluid composition suitable for use in the method of the present invention has a calculated solubility parameter coulomb term ($\delta_{clb}$) ranging from 4 to 9 $(J/cm^3)^{1/2}$, such as from 4 to 6 $(J/cm^3)^{1/2}$. The calculated solubility parameter coulomb term ($\delta_{clb}$) can be determined using an atomistic simulation in Amorphous Cell, a function implemented in Material Studio 4.2, a product of ACCELRYS®. The method for determining the calculated solubility parameter coulomb term ($\delta_{clb}$) is described in more detail in the Examples herein below. In such atomistic simulation, the cohesive energy is defined as the increase in energy per mole of a material if all intermolecular forces are eliminated. The cohesive energy density corresponds to the cohesive energy per unit volume. The solubility parameter ($\delta$) is defined as the square root of the cohesive energy density (CED). For purposes of the simulation used, the calculated solubility parameter has two terms: the van der waals term ($\delta_{vdw}$), and the coulomb term ($\delta_{clb}$), as shown in the following equation.

$$\delta^2 = \delta_{vdw}^2 + \delta_{clb}^2.$$

The extraction fluid composition can comprise any of a variety of fluid compositions provided the extraction fluid composition is non-flammable and has a boiling point of 75° C. or less. The extraction fluid composition can comprise halogenated hydrocarbons, such as chlorinated hydrocarbons and/or fluorinated hydrocarbons. In a particular embodiment of the invention, the extraction fluid composition comprises halogenated hydrocarbon(s) and has a calculated solubility parameter coulomb term ($\delta_{clb}$) ranging from 4 to 9 $(Jcm^3)^{1/2}$. Specific non-limiting examples of halogenated hydrocarbon(s) suitable for use in the method of the present invention as the extraction fluid composition can include one or more azeotropes of halogenated hydrocarbons selected from trans-1,2-dichloroethylene, 1,1,1,2,2,3,4,5,5,5-decafluoropentane, and/or 11,1,3,3-pentafluorobutane. Such materials are available commercially as VERTREL™ MCA (a binary azeotrope of 1,1,1,2,2,3,4,5,5,5-dihydrodecafluoropentane and trans-1,2-dichloroethylene: 62%/38%) and VERTREL™ CCA (a ternary azeotrope of 1,1,1,2,2,3,4,5,5,5-dihydrodecafluorpentane, 1,1,1,3,3-pentafluorbutane, and trans-1,2-dichloroethylene: 33%/28%/39%) both available from MicroCare Corporation.

The microporous sheet material prepared by the method of the present invention typically comprises 20 parts per million or less of extraction fluid composition as residual, such as 10 parts per million or less, or 5 parts per million or less, or 1 part per million or less; or 0.5 part per million or less. For purposes of the present invention, the level of residual extraction fluid composition present in the microporous sheet material is determined using Environmental Protection Agency Method EPA 8260B (Volatile Organic Compounds by Gas Chromatography/Mass Spectrometry (GC/MS)). It should be noted that for purposes of the present invention, by the term "residual extraction fluid composition" present in the microporous sheet material is meant the amount of extraction fluid composition (which had been used in the method of the present invention to extract the processing plasticizer from the microporous sheet) remaining in the final microporous sheet material produced by the method.

For some end-use applications, the microporous sheet can be stretched to decrease sheet thickness as well as to increase the void volume of the material and to induce regions of molecular orientation in the polymer matrix. Suitable stretching equipment, methods and parameters are described in detail in U.S. Pat. No. 4,877,679 at column 9, line 19, to column 11, line 32, the cited portions of which are incorporated by reference herein.

The microporous sheet material prepared by the method of the present invention, either in the form of unstretched sheet or stretched sheet, alternatively can be further processed as desired. Examples of such further processing can include reeling, cutting, stacking, treatment to further remove residual processing additives, calendering, pressing, embossing, imbibing, coating, heating, annealing, molding, and fabrication into shapes for various end uses.

The microporous sheet material prepared by the method of the present invention, using an extraction fluid composition which is essentially free of trichloroethylene, has a Tensile Strength equal to or greater than 800 kPa. For purposes of the present invention, "Tensile Strength" refers to the stress at 1% strain in the machine direction ("MD") as determined by ASTM D 828-97 (reapproved 2002) modified by using a sample crosshead speed of 5.08 cm/minute until 0.508 cm of linear travel speed is completed, at which time the crosshead speed is accelerated to 50.8 cm/second, and, where the sample width is approximately 1.2 cm and the sample gage length is 5.08 cm. It should be noted, that tensile strength of a material may be further characterized by measuring, in addition to Tensile Strength (i.e., stress at 1% strain), maximum tensile strength and maximum elongation using the method described immediately above.

The microporous sheet material prepared by the method of the present invention is printable using any of a wide variety of printing media and printing processes known in the art. The term "printable", as used herein means that the subject sheet material can be printed using some printing media, for example, printing inks, and one or more printing methods. Non-limiting examples of such printing methods include, but are not limited to, typographic printing, e.g., rubber stamp printing, letterpress printing, flexography, and letterset printing (also known as dry offset printing and offset letterpress printing); intaglio printing, and gravure printing; planographic printing, e.g., lithography, hectograph printing and xerography; stencil printing, e.g., screen printing and mimeographic printing; typewriting and dot matrix printing; ink jet printing and electrophotographic printing. Suitable printing inks can include, for example, water-based inks and toners, oil-based inks and toners. The inks and toners may be in liquid form or in solid form.

The microporous sheet material prepared by the method of the present invention is suitable for a wide variety of end uses, especially those applications where a printable surface is required. For example, the microporous sheet material is particularly suitable for durable documents such as maps, menus and cards. The microporous material demonstrates stiffness or resistance to bending as well as stability resisting printer effects such as elongation. Also, the microporous sheet material is capable of maintaining its shape and supporting any subsequently applied layers. Thus, the microporous sheet material is suitable for use as one or more layers in a multi-layer article, for example, labels, such pressure sensitive labels, in-mold labels, RFID labels, RFID inlays and cards, identification cards, smart cards, loyalty cards, passports, drivers licenses and the like.

The invention is further described in conjunction with the following examples, which are to be considered as illustrative rather than limiting, and in which all parts are parts by weight and all percentages are percentages by weight unless otherwise specified.

EXAMPLES

In Part 1 of the following examples, the materials and methods used to prepare the microporous material used for extraction with the solvents of Examples 1 and 2 and Comparative Examples 1-3 are described. In Part 2, the methods used to extrude, calender and extract the sheets prepared from the mix of Part 1 are described. In Part 3, the methods used to determine the physical properties reported in Table 3 are described. In Part 4, the methods used to determine the calculated solubility parameters of Examples 1 and 2 and Comparative Examples 1-8 reported in Table 4 are described. In Part 5, the results of the volatile organic compound analysis done according to EPA Method 8260 of the microporous materials prepared in Part 2 is reported.

Part 1—Mix Preparation

The dry ingredients were weighed into a FM-130D Littleford plough blade mixer with one high intensity chopper style mixing blade in the order and amounts (grams (g)) specified in Table I. The dry ingredients were premixed for 15 seconds using the plough blades only. The process oil was then pumped in via a hand pump through a spray nozzle at the top of the mixer, with only the plough blades running. The pumping time for the examples varied between 45-60 seconds. The high intensity chopper blade was turned on, along with the plough blades, and the mix was mixed for 30 seconds. The mixer was shut off and the internal sides of the mixer were scrapped down to insure all ingredients were evenly mixed. The mixer was turned back on with both high intensity chopper and plough blades turned on, and the mix was mixed for an additional 30 seconds. The mixer was turned off and the mix dumped into a storage container.

TABLE 1

| Ingredients | Microporous Material, grams |
| --- | --- |
| Silica (a) | 6,810 |
| $TiO_2$ (b) | 213 |
| UHMWPE (c) | 1,893 |
| HDPE (d) | 1,893 |
| Antioxidant (e) | 46 |
| Lubricant (f) | 68 |
| Process oil (g) | 11,441 |

(a) HI-SIL ® 135 precipitated silica was used and was obtained commercially from PPG Industries, Inc.
(b) TIPURE ® R-103 titanium dioxide, obtained commercially form E.I. du Pont de Nemours and Company.
(c) GUR ® 4130 Ultra High Molecular Weight Polyethylene (UHMWPE), obtained commercially from Ticona Corp.
(d) FINA ® 1288 High Density Polyethylene (HDPE), obtained commercially from Total Petrochemicals.
(e) CYANOX ® 1790 antioxidant, Cytec Industries, Inc.
(f) Calcium stearate lubricant, technical grade, obtained commercially from Fischer Scientific or Ferro Corporation.
(g) TUFFLO ® 6056 process oil, obtained commercially from PPC Lubricants.

Part 2—Extrusion, Calendering and Extraction

The mix of the microporous material was extruded and calendered into final sheet form using an extrusion system including a feeding, extrusion and calendering system described as follows. A gravimetric loss in weight feed system (K-tron model # K2MLT35D5) was used to feed each of the respective mixes into a 27 mm twin screw extruder (model # was Leistritz Micro-27gg). The extruder barrel was comprised of eight temperature zones and a heated adaptor to the sheet die. The extrusion mixture feed port was located just prior to the first temperature zone. An atmospheric vent was located in the third temperature zone. A vacuum vent was located in the seventh temperature zone.

The mix was fed into the extruder at a rate of 90 g/minute. Additional processing oil also was injected at the first temperature zone, as required, to achieve the desired total oil content in the extruded sheet. The oil contained in the extruded sheet (extrudate) being discharged from the extruder is referenced herein as the "extrudate oil weight percent".

Extrudate from the barrel was discharged into a 15-centimeter wide sheet Masterflex® die having a 1.5 millimeter discharge opening. The extrusion melt temperature was 203-210° C. and the throughput was 7.5 kilograms per hour.

The calendering process was accomplished using a three-roll vertical calender stack with one nip point and one cooling roll. Each of the rolls had a chrome surface. Roll dimensions were approximately 41 cm in length and 14 cm in diameter. The top roll temperature was maintained between 135° C. to 140° C. The middle roll temperature was maintained between 140° C. to 145° C. The bottom roll was a cooling roll wherein the temperature was maintained between 10-21° C. The extrudate was calendered into sheet form and passed over the bottom water cooled roll and wound up.

Samples of sheet cut to a width up to 9 inches (22.9 cm) and length of 6 feet (182.9) cm were rolled up and placed in separate 2 liter NALGENE® canisters. The canisters were filled with each of the solvents described in Table 2. The resulting extracts were later used in Part 3 for the determination of CYANOX® 1790 antioxidant levels. Each canister was mildly shaken and left for one hour. Afterwards, each of the extracted sheets was air dried and subjected to test methods described hereinafter.

TABLE 2

| Solvent Identification | Name | Chemical Description | Boiling Point, ° C. |
|---|---|---|---|
| Example 1 | VERTREL ™ CCA | Ternary azeotrope reported to be composed of: 2,3-dihydrodecafluoropentane = 33% by wgt. 1,1,1,3,3-pentafluorobutane = 28% by wgt. 1,2-transdichloroethylene = 39% by wgt. | 41 |
| Example 2 | VERTREL ™ MCA | Binary azeotrope reported to be composed of: 2,3-dihydrodecafluoropentane = 62% by wgt. 1,2-transdichloroethylene = 38% by wgt. | 37 |
| Comparative Example 1 | TCE | Trichloroethylene | 87 |
| Comparative Example 2 | Methylene Chloride | Dichloromethane | 40 |
| Comparative Example 3 | Tetrachloroethylene | Tetrachloroethylene | 121 |

Part 3—Testing and Results

Physical properties measured on the extracted and dried films and the results obtained are listed in Table 3. Thickness was determined using an Ono Sokki thickness gauge EG-225. Two 4.5×5 inch (11.43 cm×12.7 cm) specimens were cut from each sample and the thickness for each specimen was measured in nine places (at least ¾ of an inch (1.91 cm) from any edge). The arithmetic average of the readings was recorded in mils to 2 decimal places and converted to microns.

The residual oil weight percent was measured using a Soxhlet extractor. A sample specimen approximately 2.25×5 inches (5.72 cm×12.7 cm) was weighed and recorded to four decimal places. Each specimen was then rolled into a cylinder and placed into a Soxhlet extraction apparatus and extracted for approximately 30 minutes using trichloroethylene (TCE) as the solvent. The specimens were then removed and dried. The extracted and dried specimens were then weighed. The residual oil weight percentage values were calculated as follows: Oil Wt. %=(initial wt.−extracted wt.)×100/initial wt.

Tensile Strength and maximum elongation and the total percentage increased at maximum elongation were done in accordance with ASTM D 828-97 (Reapproved 2002), except that the sample crosshead speed was 5.08 centimeters/minute (cm/min) and the sample width was 1.27 cm. Property values indicated by MD (machine direction) were obtained on samples whose major axis was oriented along the length of the sheet. CD (cross machine direction) properties were obtained from samples whose major axis was oriented across the sheet. The aforementioned ASTM test method is incorporated herein by reference.

Thermal shrinkage was determined on samples at least 24 hours after extraction. Samples were cut from the center of the extracted sheets using a 13 cm by 11 cm die with the 13 cm side running in the machine direction. The samples were placed in a 150° C. oven for 30 minutes. Afterwards, the samples were removed and allowed to cool at room temperature for 2 minutes. Each sample was measured 3 times in the machine direction (MD) at the top, middle and bottom of the sheet and in the cross direction (CD) in the same manner. Arithmetic averages of the results for MD and CD were determined and are reported in Table 3.

CYANOX® 1790 antioxidant at ppm levels was determined in the extracts prepared in Part 2. Five mL of each of the extracts was mixed with five mL of tetrahydrofuran (THF-UV-grade). Calibration standards were prepared using a range from 4 ppm to 100 ppm of CYANOX® 1790 antioxidant in a mixed solvent of 50 volume percent trichloroethylene and 50 percent volume THF-UV-grade. A gradient HPLC method with UV detection at 284 nm was used. The limit of detection of the method was 5 ppm. The retention time for CYANOX® 1790 antioxidant was 4.2 minutes. An AGILENT® 1100 system equipped with a PHENOMENEX® Gemini C6-Ph, 5μ, 150×4.6 mm column at a temperature of 40° C. was used. The results for the CYANOX® 1790 antioxidant levels in Table 3 are reported as an arithmetic average of duplicate tests on the same extract tested in the "B" group of samples described below. The injection volume was 10 μL with a flow rate of 1.5 mL/minute. The time table of the mobile phases A=distilled water and B=acetonitrile was as follows:

| Time (minutes) | Percent A | Percent B |
|---|---|---|
| 0 | 20 | 80 |
| 10 | 10 | 90 |
| 12 | 0 | 100 |
| 30 | 0 | 100 |

The test results for different sections of the microporous material prepared in Part 1 that were extracted with the solvents of the Examples and Comparative Examples in Part 2 are presented in Table 3. Duplicate tests were designated in Table 3 by Example # A and Example # B.

The results in Table 3 show that the MD stress @ 1% strain values of Examples 1 and 2 are greater than the values of Comparative Example 2. The MD stress @ 1% strain values of Examples 1 and 2 are comparable to the values of Comparative Examples 1 and 3 indicating that microporous material of comparable strength was produced with Examples 1 and 2. Examples 1 and 2 would be more energy efficient in use than Comparative Examples 1 and 3 since both have lower boiling points than Comparative Examples 1 and 3. The MD stress @ 1% strain value of equal to or greater than 800 kPa of the Examples of the present invention provides stiffness, i.e., resistance to bending, and stability against adverse printer effects such as elongation causing distortion of the printed image.

parameters of the solvent blends (i.e. VERTREL™ solvents) was calculated using the solubility parameter and volume fraction ($\Phi$) of the individual components, as shown in the following equation:

$$\delta_{blend} = \Phi_1\delta_1 + \Phi_2\delta_2 + \ldots$$

For each solvent, within the 3 dimensional Amorphous Cell, 20 molecules were constructed with experimental density. The molecular dynamic simulations were conducted at 298° Kelvin with atom based summation for van der Waals

TABLE 3

| Parameter Tested | 1A | 1B | 2A | 2B | CE1A | CE1B | CE2A | CE2B | CE3A | CE3B |
|---|---|---|---|---|---|---|---|---|---|---|
| Thickness (mils) | 7.48 | 8.20 | 7.80 | — | 7.19 | 7.10 | 7.70 | 7.70 | 6.70 | 6.93 |
| % Residual oil | 4.56 | 7.4 | 8.21 | 30 | 4.25 | — | 3.98 | 3.20 | 3.30 | 3.20 |
| MD Stress @ 1% Strain (kPa) | 938 | 1,420 | 896 | — | 910 | 1364 | 338 | 634 | 1,358 | 841 |
| MD Stress @ Max Elongation (kPa) | 5,226 | 6,012 | 5,047 | — | 5,943 | 4691 | 5,088 | 5,088 | 5,730 | 4,247 |
| MD Max Elongation (%) | 432 | 659 | 379 | — | 836 | 480 | 739 | 682 | 549 | 616 |
| CD Stress @ 1% Strain (kPa) | 1,200 | 779 | 1,124 | — | 1,110 | 992 | 634 | 559 | 1,345 | 669 |
| CD Stress @ Max Elongation (kPa) | 4,047 | 5,867 | 4,592 | — | 4,571 | 4,202 | 3,978 | 5,343 | 4,592 | 4,247 |
| CD Max Elongation (%) | 279 | 724 | 461 | — | 602 | 482 | 468 | 729 | 487 | 649 |
| CD Thermal Shrinkage (%) | 4.09 | 2.70 | 4.27 | — | 1.64 | 1.7 | 3.50 | 2.70 | 0.50 | 0.50 |
| MD Thermal Shrinkage (%) | 5.31 | 3.80 | 5.31 | — | 3.08 | 1.8 | 4.50 | 3.90 | 1.80 | 1.40 |
| CYANOX ® 1790 (ppm) | — | <5 | — | <5 | — | <5 | — | 8 | — | <5 |

Part 4—Calculation of the Solubility Parameter

The solubility parameter ($\delta$) is defined as the square root of the cohesive energy density (CED). The cohesive energy density corresponds to the cohesive energy per unit volume. In atomistic simulations, the cohesive energy is defined as the increase in energy per mole of a material if all intermolecular forces are eliminated.

The calculated solubility parameter ($\delta_{sp}$) was based on two calculated terms: van der Waals term ($\delta_{vdw}$) and coulomb term ($\delta_{clb}$) as shown in the following equation.

$$\delta_{sp}^2 = \delta_{vdw}^2 + \delta_{clb}^2$$

The calculated solubility parameter for the solvents was determined using the ACCELRYS® Amorphous Cell suite of computational tools implemented in the Materials Studio 4.2 software environment. The Condensed-phase Optimized Molecular Potentials for Atomistic Simulation Studies (Compass forcefield) was used to minimize energy in the Amorphous Cell. Construction and optimization of the molecular structures was completed for the following solvents: trichloroethylene; tetrachloroethylene; methylene chloride; trans-1,2-dichloroethylene; 1,1,1,2,2,3,4,5,5,5-decafloropentane; 1,1,1,3,3-pentafluorobutane and cyclopentane. The solubility interaction and Ewald for Coulomb interactions. The Amorphous Cells were first equilibrated in NVT (constant volume and temperature) ensemble for 50 picoseconds (ps). Data was collected every 5 ps during a production run of 100 ps. The solubility parameter of each frame was calculated based on the cohesive energy density. The final solubility parameter of the individual species was the arithmetic average solubility parameter of 20 frames listed in Table 4.

TABLE 4

| | Experimental | | | | |
| Example # | MW (g/mole) | Density (g/cm³) | $\delta_{sp}$ (J/cm³)$^{1/2}$ | $\delta_{vdw}$ (J/cm³)$^{1/2}$ | $\delta_{clb}$ (J/cm³)$^{1/2}$ |
|---|---|---|---|---|---|
| 1 | 138 | 1.35 | 16.5 | 15.6 | 5.4 |
| 2 | 157 | 1.41 | 16.1 | 15.5 | 4.4 |
| CE 1 | 131 | 1.46 | 20.4 | 20.0 | 3.9 |
| CE 2 | 85 | 1.33 | 19.3 | 18.2 | 6.5 |
| CE 3 | 166 | 1.62 | 20.9 | 20.8 | 1.3 |
| CE 4[h] | 97 | 1.26 | 19.1 | 18.9 | 2.9 |
| CE 5[i] | 252 | 1.58 | 14.0 | 12.8 | 5.6 |
| CE 6[j] | 148 | 1.27 | 16.1 | 13.4 | 8.8 |

TABLE 4-continued

| Example # | MW (g/mole) | Experimental Density (g/cm³) | $\delta_{sp}$ (J/cm³)^{1/2} | $\delta_{vdw}$ (J/cm³)^{1/2} | $\delta_{clb}$ (J/cm³)^{1/2} |
|---|---|---|---|---|---|
| CE 7[k] | 70 | 0.75 | 16.6 | 16.6 | 0.5 |
| CE 8[l] | 136 | 1.33 | 16.6 | 16.1 | 3.8 |

[h]Comparative Example 4 was trans-1,2-dichloroethylene.
[i]Comparative Example 5 was 1,1,1,2,2,3,4,5,5,5-decafluoropentane.
[j]Comparative Example 6 was 1,1,1,3,3-pentafluorobutane.
[k]Comparative Example 7 was cyclopentane.
[l]Comparative Example 8 was VERTREL ™ MCA plus reported to be a mixture of trans-1,2-dichloroethylene (45% by weight); 1,1,1,2,2,3,4,5,5,5-decafluoropentane (50% by weight); and cyclopentane (5% by weight).

Part 5—Volatile Organic Analysis per EPA Method 8260

EPA Method 8260—Volatile Organic Compounds by Gas Chromatography/Mass Spectroscopy (GC/MS) (Revision 2, December 1996) was used to determine various volatile organic compounds (ppb levels) in the microporous material prepared in Part 2 extracted with Examples 1 and 2 and Comparative Examples 1-3. The levels of the compounds detected are presented in Table 5.

TABLE 5

| Compounds Detected (ppb) | Example 1 | Example 2 | Comparative Example 1 | Comparative Example 2 | Comparative Example 3 |
|---|---|---|---|---|---|
| ethylbenzene | 22 | 22 | <MDL[m] | 23 | 28 |
| methylene chloride | 200 | 371 | 782 | 18,870 | 64 |
| tetrachloroethylene | <MDL[m] | <MDL[m] | <MDL[m] | <MDL[m] | 298 |
| Toluene | 44 | 35 | 32 | 46 | 15 |
| trans-1,2-dichloroethylene | <MDL[m] | <MDL[m] | <MDL[m] | <MDL[m] | <MDL[m] |
| trichloroethylene | <MDL[m] | <MDL[m] | 259 | <MDL[m] | 18 |

[m]Method Detection Limit.

Whereas particular embodiments of this invention have been described above for purposes of illustration, it will be evident to those skilled in the art that numerous variations of the details of the present invention may be made without departing from the invention as defined in the appended claims.

Therefore, we claim:

1. A method of producing a microporous sheet material comprising: a polymeric matrix comprising polyolefin, finely divided substantially water-insoluble inorganic filler distributed throughout the matrix, and a network of interconnecting pores communicating throughout the microporous material, said method comprising:
    (a) forming a mixture comprising the polyolefin, the inorganic filler and processing plasticizer composition;
    (b) extruding the mixture to form a continuous sheet; and
    (c) contacting the continuous sheet with an extraction fluid composition to extract the processing plasticizer composition from the continuous sheet to form the microporous sheet material;
    wherein the extraction fluid composition consists essentially of an azeotrope of
        a mixture of trans-1,2-dichloroethylene and 1,1,1,2,3,4,5,5-decafluoropentane,
        a mixture of trans-1,2-dichlorethylene and 1,1,1,3,3-pentafluorobutane,
        a mixture of 1,1,1,2,2,3,4,5,5-decafluoropentane and 1,1,1,3,3-pentafluorobutane, or
        a mixture of trans-1,2-dichlorethylene, 1,1,1,2,2,3,4,5,5,5-decafluoropentane and 1,1,1,3,3-pentafluorobutane,
    said extraction fluid composition being non-flammable essentially free of trichloroethylene, and having a boiling point of 75° C. or less, and
    wherein the microporous sheet material has a tensile strength of at least 800 kPa.

2. The method of claim 1, wherein the microporous sheet material contains 20 percent by weight or less of processing plasticizer composition.

3. The method of claim 1, wherein the microporous sheet material contains 20 parts per million or less of extraction fluid composition.

4. The method of claim 1, wherein the microporous sheet material contains 10 parts per million or less of extraction fluid composition.

5. The method of claim 1, wherein the extraction fluid composition has a boiling point of 45° C. or less.

6. The method of claim 1, wherein the extraction fluid composition has a boiling point ranging from 20° C. to 45° C.

7. The method of claim 1, wherein the processing plasticizer composition comprises a processing oil chosen from paraffinic oil, naphthenic oil, and/or aromatic oil.

8. The method of claim 1, wherein the extraction fluid composition has a calculated solubility parameter coulomb term ($\delta_{clb}$) ranging from 4 to 9 (J/cm³)$^{1/2}$.

9. The method of claim 1, wherein the polyolefin comprises ultrahigh molecular weight polyethylene, ultrahigh molecular weight polypropylene, high density polyethylene and/or high density polypropylene.

10. The method of claim 1, wherein the filler is an inorganic filler material comprising a siliceous filler.

11. The method of claim 10, wherein the siliceous filler comprises precipitated silica.

12. The method of claim 1, wherein the filler is present in the microporous sheet material in an amount ranging from 50 to 90 percent by weight.

13. The method of claim 1, wherein the interconnecting pores constitute 35 to 70 percent by volume of the microporous sheet material.

14. A method of producing microporous sheet material comprising: a polymeric matrix comprising polyolefin chosen from ultrahigh molecular weight polyethylene, ultrahigh molecular weight polypropylene, high density polyethylene, high density polypropylene and mixtures of said polyolefins; finely divided, substantially water-insoluble inorganic siliceous filler material comprising precipitated silica distributed throughout the microporous sheet material, said siliceous filler being present in the microporous sheet material in amounts ranging from 40 to 90 percent by weight; and a network of interconnecting pores communicating throughout the microporous sheet material, the interconnecting pores constituting from 35 to 70 percent by volume of the microporous sheet material; said method comprising:

(a) forming a mixture comprising the polyolefin, inorganic siliceous filler and processing plasticizer composition comprising a processing oil chosen from paraffinic oil, naphthenic oil and/or aromatic oil;

(b) extruding the mixture to form a continuous sheet; and (c) contacting the continuous sheet with an extraction fluid composition to extract the processing plasticizer composition from the continuous sheet to form the microporous sheet material;

wherein the extraction fluid composition consists essentially of an azeotropic composition of a mixture of trans-1,2-dichloroethylene and 1,1,1,2,2,3,4,5,5,5-decafluoropentane, a mixture of trans-1,2-dichlorethylene and 1,1,1,3,3-pentafluorobutane, a mixture of 1,1,1,2,2,4,5,5,5-derafluoropentane and 1,1,1,3,3-pentafluorobutane, or a mixture of trans-1,2-dichlorethylene, 1,1,1,2,2,3,4,5,5,5-decafluoropentane and 1,1,1,3,3-pentafluorobutane, said extraction fluid composition being non-flammable, essentially free of trichloroethylene, and having a boiling point of from 20°C. to 65° C., and wherein the microporous sheet material has a tensile strength of at least 800 kPa.

15. The method of claim 14 wherein the azeotropic extraction fluid has a calculated solubility parameter coulomb term ($\delta_{clb}$) ranging from 4 to 9 $(J/cm^3)^{1/2}$, and the microporous sheet material contains not more than 20 parts per million of the extraction fluid composition.

16. The method of claim 15, wherein the extraction fluid composition has a calculated solubility parameter coulomb term ($\delta_{clb}$) ranging from 4 to 6 $(J/cm^3)^{1/2}$.

17. The method of claim 14 wherein the extraction fluid composition comprises a ternary azeotropic composition of 33 weight percent 1,1,1,2,2,3,4,5,5,5decafluoropentane, 28 weight percent 1,1,1,3,3-pentafluorobutane, and 39 weight percent trans-1,2-dichloroethylene.

18. The method of claim 14 wherein the extraction fluid composition comprises a binary azeotropic composition of 62 weight percent 1,1,1,2,2,3,4,5,5,5decafluoropentane and 38 weight percent trans-1,2-dichloroethylene.

* * * * *